United States Patent
Lin et al.

(10) Patent No.: US 7,680,005 B2
(45) Date of Patent: Mar. 16, 2010

(54) DETECTING APPARATUS FOR DETECTING STATUSES OF OPTICAL DISC AND METHOD THEREOF

(75) Inventors: Yu-Hsuan Lin, Tai-Chung (TW); Ching-Ning Chiu, Hsin-Chu Hsien (TW)

(73) Assignee: Mediatek Inc., Hsin-Chu (TW)

( * ) Notice: Subject to any disclaimer, the term of this patent is extended or adjusted under 35 U.S.C. 154(b) by 430 days.

(21) Appl. No.: 11/736,559

(22) Filed: Apr. 17, 2007

(65) Prior Publication Data

US 2008/0259747 A1    Oct. 23, 2008

(51) Int. Cl.
*G11B 27/36* (2006.01)

(52) U.S. Cl. ................. 369/53.16; 369/53.24

(58) Field of Classification Search ... 369/53.15–53.17, 369/53.24, 47.14
See application file for complete search history.

(56) References Cited

U.S. PATENT DOCUMENTS

| | | | | |
|---|---|---|---|---|
| 6,307,822 B1 * | 10/2001 | Shim et al. | ................ | 369/47.18 |
| 6,728,180 B1 * | 4/2004 | Park | ................ | 369/53.11 |
| 7,057,991 B2 * | 6/2006 | Park et al. | ................ | 369/53.15 |
| 2002/0176340 A1 * | 11/2002 | Yamamoto et al. | ........ | 369/53.15 |
| 2004/0145987 A1 * | 7/2004 | Ryu et al. | ................ | 369/53.15 |
| 2005/0276194 A1 * | 12/2005 | Kim et al. | ................ | 369/53.15 |
| 2007/0143771 A1 * | 6/2007 | Zhou et al. | ................ | 720/658 |

* cited by examiner

*Primary Examiner*—Thang V Tran
(74) *Attorney, Agent, or Firm*—Winston Hsu

(57) ABSTRACT

Disclosed are detecting apparatus for detecting statuses of an optical disc and methods thereof, which can avoid or reduce erroneous status decisions at the edge of a blank region. The detecting apparatus includes a blank detector, for detecting a blank region of the optical disc to generate a blank detection signal; an edge detector, for detecting a transition of the blank detection signal to generate an edge detection signal; a control circuit, in response to the edge detection signal for outputting control signals; and a defect detector in response to the control signals for detecting defect region of the optical disc to generate a defect decision signal.

22 Claims, 5 Drawing Sheets

DETECTING APPARATUS FOR DETECTING STATUSES OF OPTICAL DISC AND METHOD THEREOF

BACKGROUND

The invention relates to an optical disc drive system, and more particularly, to a detecting apparatus for detecting statuses of an optical disc and a method thereof.

When an optical disc drive system reads data from an optical disc, it first detects the status of a sector presently accessed by an optical pick-up head to determine whether the sector contains data or not. The status of a sector could be blank, not blank, or defect. Only if the sector contains data, i.e. not blank, the system will retrieve data from the optical disc. The system determines the sector as a non-blank sector when it detects a radio frequency (RF) signal with larger amplitude, determines the sector as a blank sector when it detects the RF signal with smaller amplitude, or determines the sector as a defect sector when it detects the RF signal with a low direct current (DC) level. However, a wrong decision as to the status of a sector is easily made at the transition between a blank region and a data region (i.e. the non-blank region) of the optical disc. This is due to the reflectivity variation between the blank region and the data region. The reflectivity of the blank region for a first kind of optical discs (such as CD, DVD discs) is usually higher than that of the data region. Therefore, a large DC value variation of the RF signal will be detected by the system when the optical pick-up head moves from the blank region to the data region, thereby mistaking the data region for the defect region. For a second kind of optical discs (such as low-to-high Blu-ray discs), the reflectivity of the data region may usually be higher than that of the blank region. Therefore, a large DC value variation of the RF signal will be detected by the system when the optical pick-up head moves from the data region to the blank region, thereby mistaking the blank region for the defect region. Moreover, because the RF signal is influenced in the defect region, the amplitudes of the RF signal in the defect region will sometimes be small. In this situation, the system may mistake a defect region for a blank region. It is obvious that if the above situations cannot be avoided or alleviated, the accuracy of the data read by the system and even the stability of the system will be seriously degraded.

SUMMARY

One objective of the invention is therefore to provide a detecting apparatus for detecting statuses of an optical disc and a method thereof, which can avoid or reduce the erroneous status decisions of the optical disc, and thereby provide stable performance.

According to an exemplary embodiment of the invention, a detecting apparatus for detecting statuses of an optical disc comprises a blank detector, an edge detector, a control circuit and a defect detector. The blank detector is for detecting a blank region of the optical disc to generate a blank detection signal. The edge detector is coupled to the blank detector, and for detecting a transition of the blank detection signal to generate an edge detection signal. The control circuit is in response to the edge detection signal for outputting a first control signal. And the defect detector is in response to the first control signal for detecting defect region of the optical disc to generate a defect decision signal.

According to another exemplary embodiment of the invention, a detecting method for detecting statuses of an optical disc comprises the following steps: detecting blank regions of the optical disc to generate a blank detection signal; detecting a transition of the blank detection signal to generate a edge detection signal; generating a first control signal according to the edge detection signal; and detecting defect regions of the optical disc in response to the first control signal to generate a defect decision signal.

According to another exemplary embodiment of the invention, a detecting method for detecting statuses of an optical disc comprises the following steps: detecting defect regions of the optical disc to generate a defect decision signal; detecting blank regions of the optical disc to generate a blank detection signal; and outputting the blank detection signal according to the defect decision signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
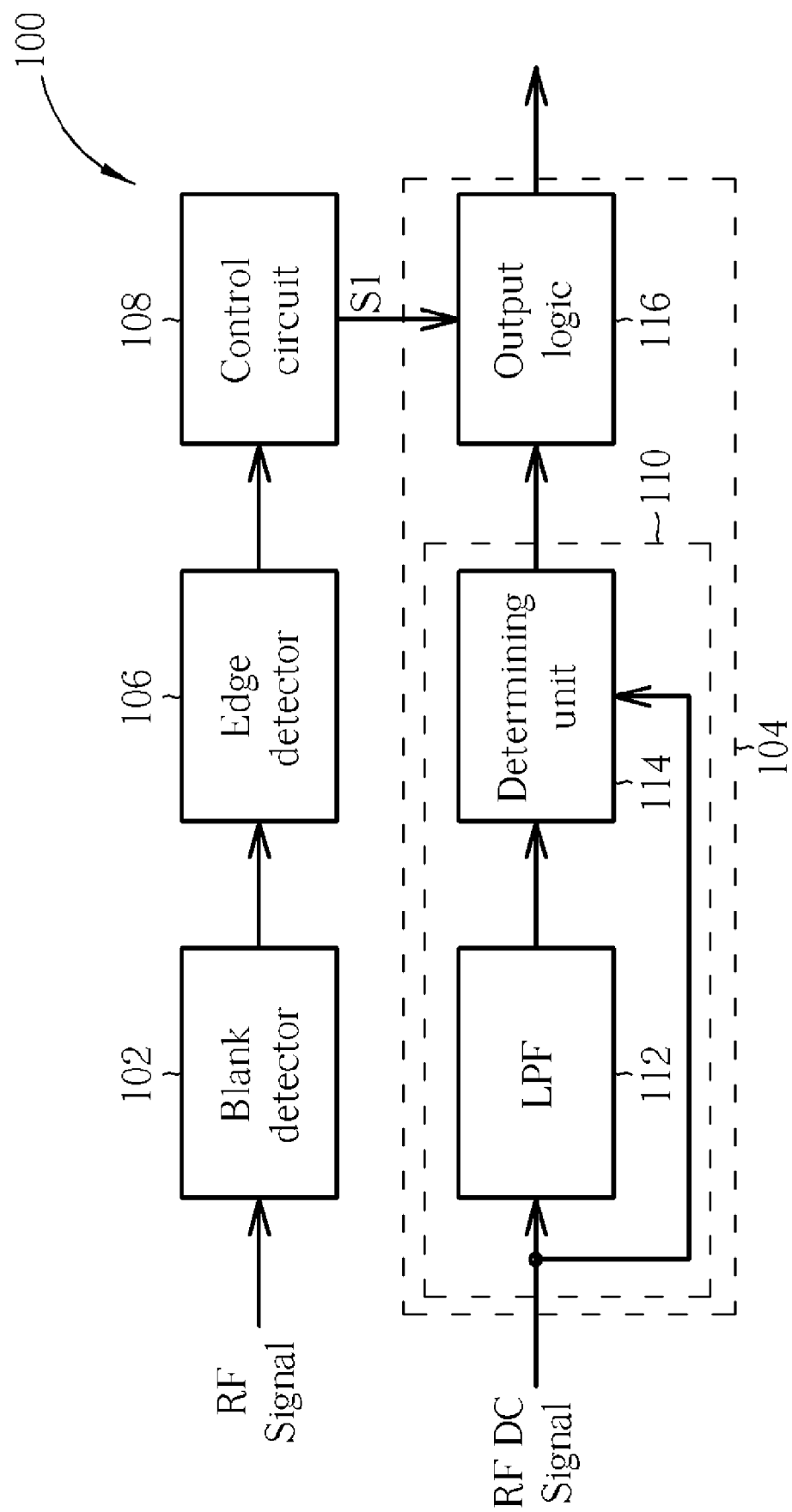
FIG. 1 is a diagram of a detecting apparatus for detecting statuses of an optical disc according to an exemplary embodiment of the invention.

FIG. 1 shows a detecting apparatus 100 for detecting statuses of an optical disc according to an exemplary embodiment of the invention. The detecting apparatus 100 in FIG. 1 comprises a blank detector 102, a defect detector 104, an edge detector 106 and a control circuit 108. The blank detector 102 receives an RF signal generated by accessing the optical disc and detects blank regions according to the incoming RF signal. The defect detector 104 comprises an output logic 116 and a defect detecting module 110. The defect detecting module 110 receives an RF DC signal which represented a DC level of the RF signal and then generates a defect decision signal. The RF signal and RF DC signal can be generated by any means known to those skilled in this art, and further description is therefore omitted here for brevity. The defect detecting module 110 utilizes a low-pass-filter (LPF) 112 to filter the RF DC signal in order to generate a filtered RF DC signal, and utilizes a determining unit 114, coupled to the LPF 112, to compare the RF DC signal with the filtered RF DC signal to generate a comparison result to determine if there is a defect according to the comparison result.

One embodiment of the determining unit 114 is implemented by an adder and a slicer (both not shown), wherein the adder compares the RF DC signal with the filtered RF DC signal by subtracting the filtered RF DC signal from the RF DC signal. And the slicer functions as a decision maker to generate the defect decision signal, and to determine that the region is the defect region if the subtracting result of the adder is higher than a predetermined threshold. Note that the operations of the blank detector 102 and the defect detecting module 110 are familiar to those skilled in the art, therefore detailed descriptions are omitted here for the sake of brevity.

The blank detector 102 detects a blank region of the optical disc according to the amplitude of the RF signal, and generates a blank detection signal. The edge detector 106 detects a transition of the blank detection signal and generates an edge detection signal. The edge detector 106 may detect a rising edge or a falling edge of the blank detection signal. Based on the system requirement since a large DC value variation causes the defect detecting module 110 to erroneously detect a data or a blank region as a defect may occur at the falling edge of the RF detection signal according to the disc type of the optical disc. Then, when the edge is detected by the edge detector 106, the control circuit 108, for example a first time window (not shown), outputs a first control signal S1 to the output logic 116, and controls the output logic 116 to mask the output of the defect decision signal from the defect detecting module 110.

Note that the control circuit 108 allows the first control signal S1 to be transmitted to the defect detector 104 during a period of time corresponding to a first predetermined time window in response to the edge detection signal. In other words, the output of the defect detecting module 110, i.e. the defect decision signal, is masked by the output logic 116 during the first predetermined time window to prevent the erroneous defect decision signal generated by the defect detecting module 110 from causing the optical disc drive system to become unstable, but after the first predetermined time window expires, the output logic 116 will output the defect decision signal of the defect detecting module 110 normally, and let the function of the defect detector 104 return to normal.

In this embodiment, the output logic 116, for example, is accomplished by an AND Gate, wherein the first input node of the AND Gate is coupled to the output of the defect detecting module 110 to receive the defect decision signal, and the input of the second input node is controlled by the first control signal S1. When the input of the second input node is '0', the output of the output logic 116 is also '0' no matter what is inputted to the first input node, hence the objective of masking the output of the defect detecting module 110 is achieved. Please note that the above embodiment of the output logic 116 is for illustrative purposes only, and is not meant to be a limitation. That is, alternative designs that can reach substantially the same result all fall within the scope of the present invention.

Figure 2:
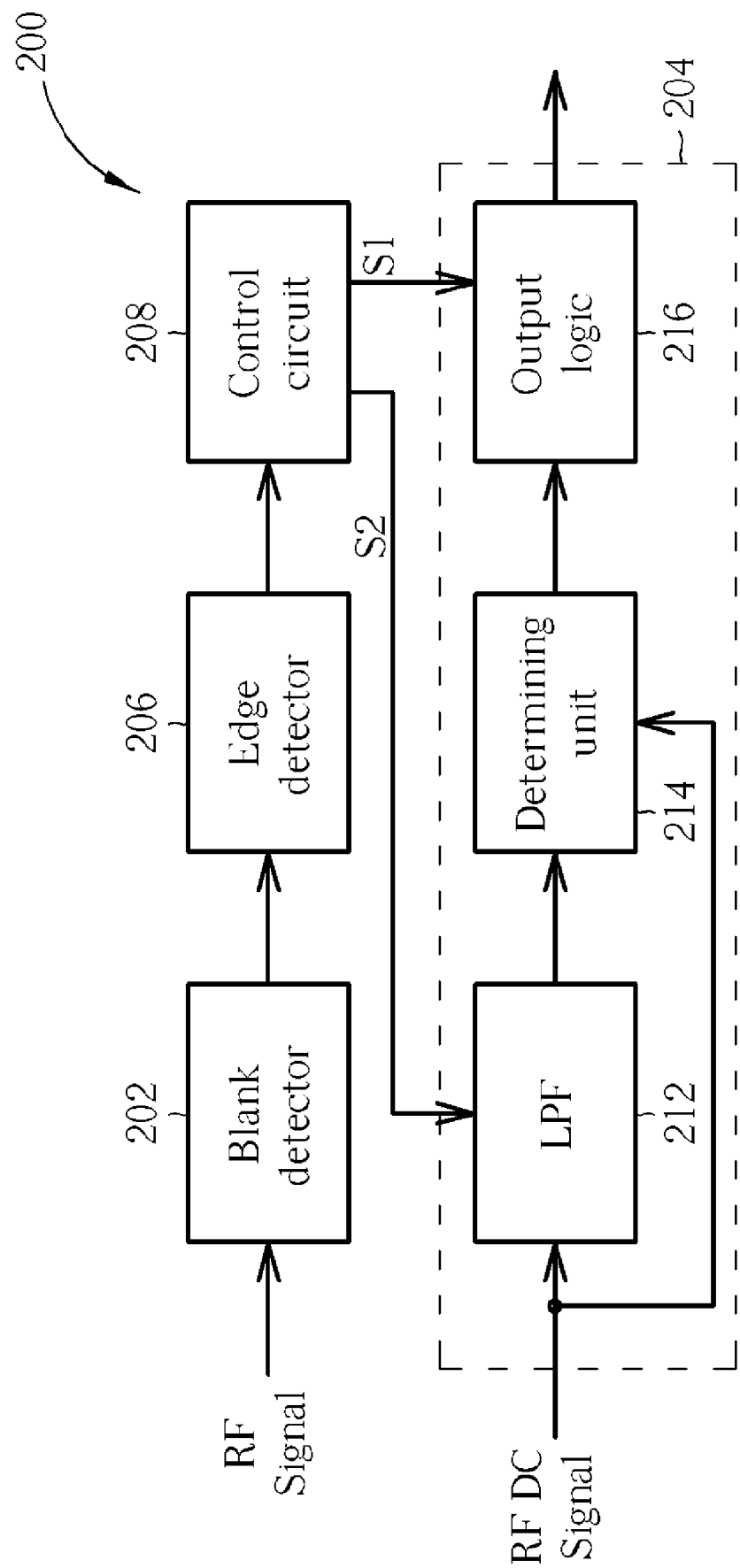
FIG. 2 is a diagram of a detecting apparatus for detecting statuses of an optical disc according to another exemplary embodiment of the invention.
Figure 3:
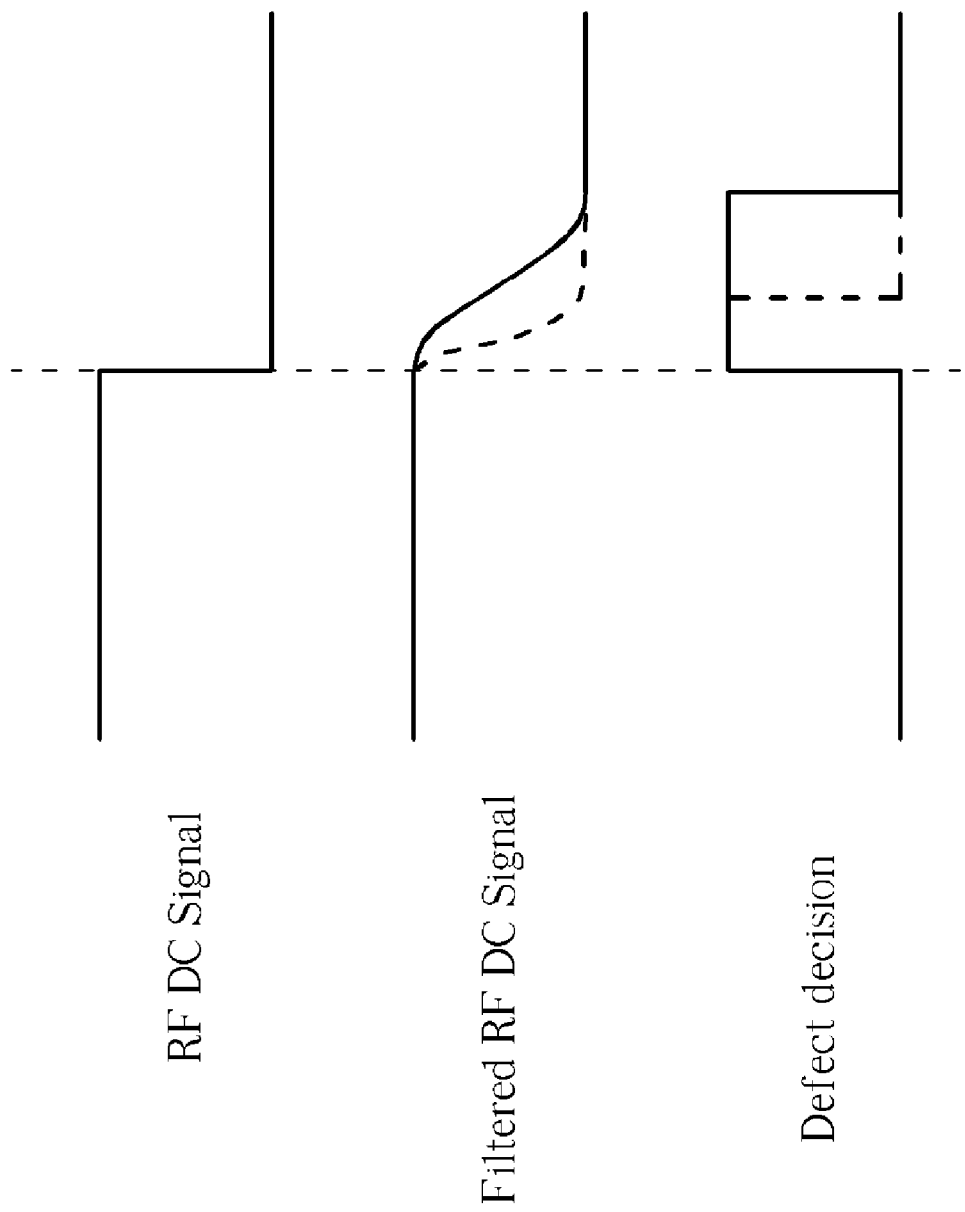
FIG. 3 shows an example of the defect decisions made before and after the defect detecting mechanism of the defect detector is adjusted.

Referring to FIG. 2, which is a diagram of a detecting apparatus 200 based on the detecting apparatus 100 according to another exemplary embodiment of the invention, the control circuit 208 of the detecting apparatus 200 outputs a first control signal S1 and a second control signal S2 when a transition of the blank detection signal, a rising edge or a falling edge, is detected by the edge detector 206. Note that the functions of the blank detector 202 and the edge detector 206 are the same as the blank detector 102 and the edge detector 106 in FIG. 1 respectively, and the output logic 216 masks the output of the determining unit 214 according to the first control signal S1 as well. In this embodiment, the second control signal S2 generated by the control circuit 208, for example a second time window (not shown), is transmitted to the LPF 212 to adjust a bandwidth of the LPF 212 during a period of time corresponding to a second predetermined time window. By adjusting the parameters of the LPF 212, the bandwidth can be adjusted to become higher. Therefore the filtered RF DC signal outputted from the LPF 212 to the determining unit 214 has a sharper edge when the bandwidth of the LPF 212 is boosted. FIG. 3 illustrates an example of the defect decisions made by the determining unit 214 before and after the bandwidth of the LPF 212 is adjusted. The solid lines in FIG. 3 represent the generated signals before the bandwidth adjustment is made, while the dotted lines represent the generated signals after the bandwidth adjustment is made. As can be seen, the length of the defect decision signal becomes shorter because the transition of the filtered RF DC signal is sharper. Therefore, the time interval that the output of the determining unit 214 needs to be masked, i.e. the first predetermined time window of the detecting apparatus 200, is shortened accordingly. Note that the control circuit 208 allows the second control signal S2 to be transmitted to the LPF 212 during a period of time corresponding to a second predetermined time window. That is, the bandwidth of the LPF 212 is adjusted during the second predetermined time window to shorten the length of the erroneous defect decision signal and therefore lower the influence of the erroneous defect decision on the optical disc drive system, but after the second predetermined time window expires, the function of the LPF 312 returns to normal.

The detecting apparatus 200 adjusts the parameters or the defect detecting mechanism of the defect detector 204 according to the detection results of the blank detector 202 to ensure that erroneous defect decisions will not be made at the edge of the blank detection signal. The output logic 216 of the detecting apparatus 200 can be set outside the defect detector 204.

Figure 4:
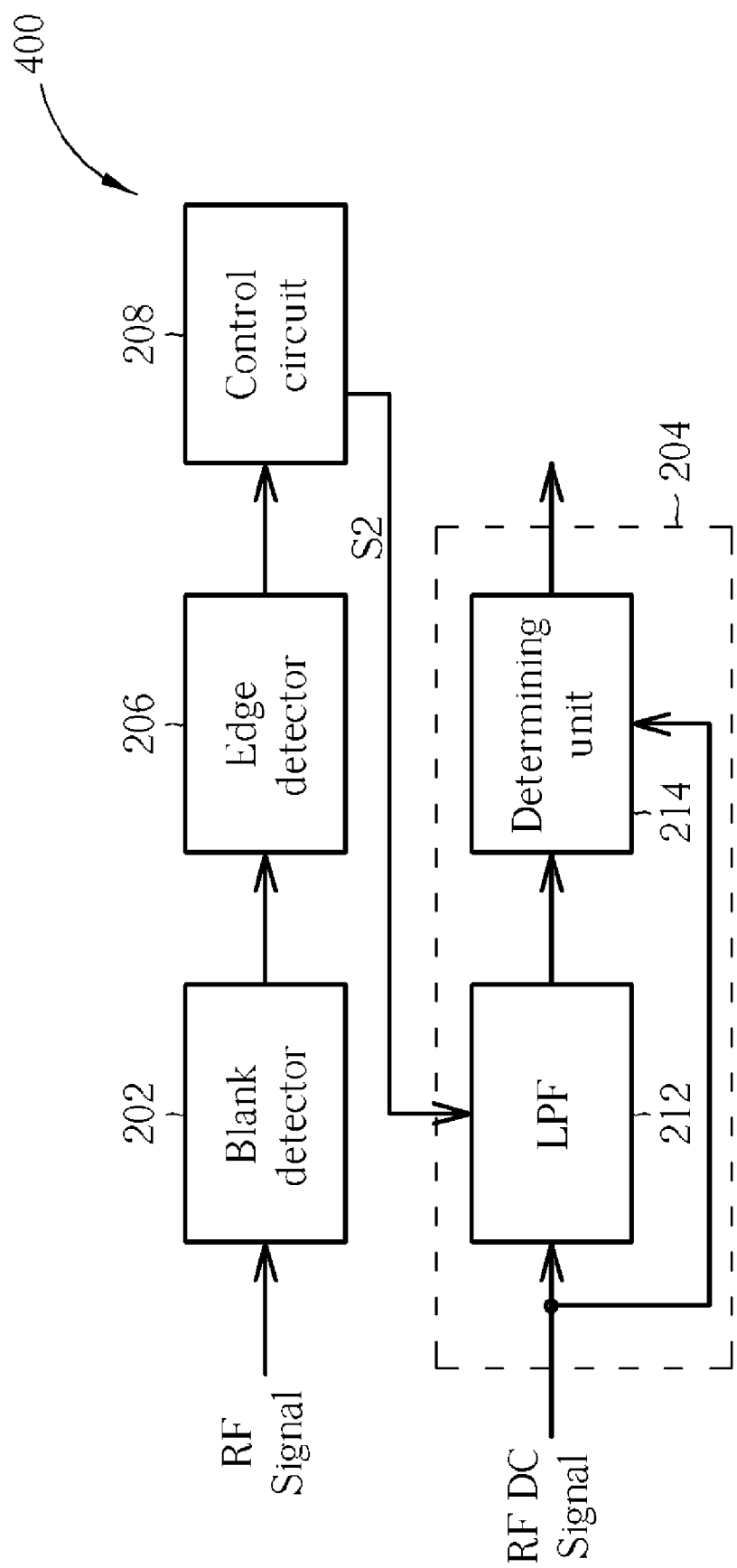
FIG. 4 is a diagram of a detecting apparatus for detecting statuses of an optical disc according to another exemplary embodiment of the invention.

Furthermore, in an alternative design of a detecting apparatus 400 shown in FIG. 4, the output logic 216 in FIG. 2 can be omitted. In this way, the defect decision of the defect detector 204 is not completely zero but a short signal as the dotted line shown in FIG. 3 is generated. If the length of the defect decision is short enough, which means the bandwidth of the LPF 212 is high enough, this erroneous decision of the status will not cause a significant effect on the optical disc drive system, and is highly probable to be corrected by a following error correction mechanism provided within the system.

The above-mentioned embodiments disclose structures and methods for avoiding erroneous decisions made by the defect detector at the edges of the blank regions by adjusting the defect detecting mechanism of the defect detector according to the detection results of the blank detector.

Likewise, erroneous decisions of the blank detector caused from mistaking defect regions with low-amplitude RF signal as blank regions can be avoided by adjusting the blank detecting mechanism of the blank detector according to the detection results of the defect detector.

The following is an example of the combination adjusting mechanisms of the blank detector and the defect detector.

Figure 5:
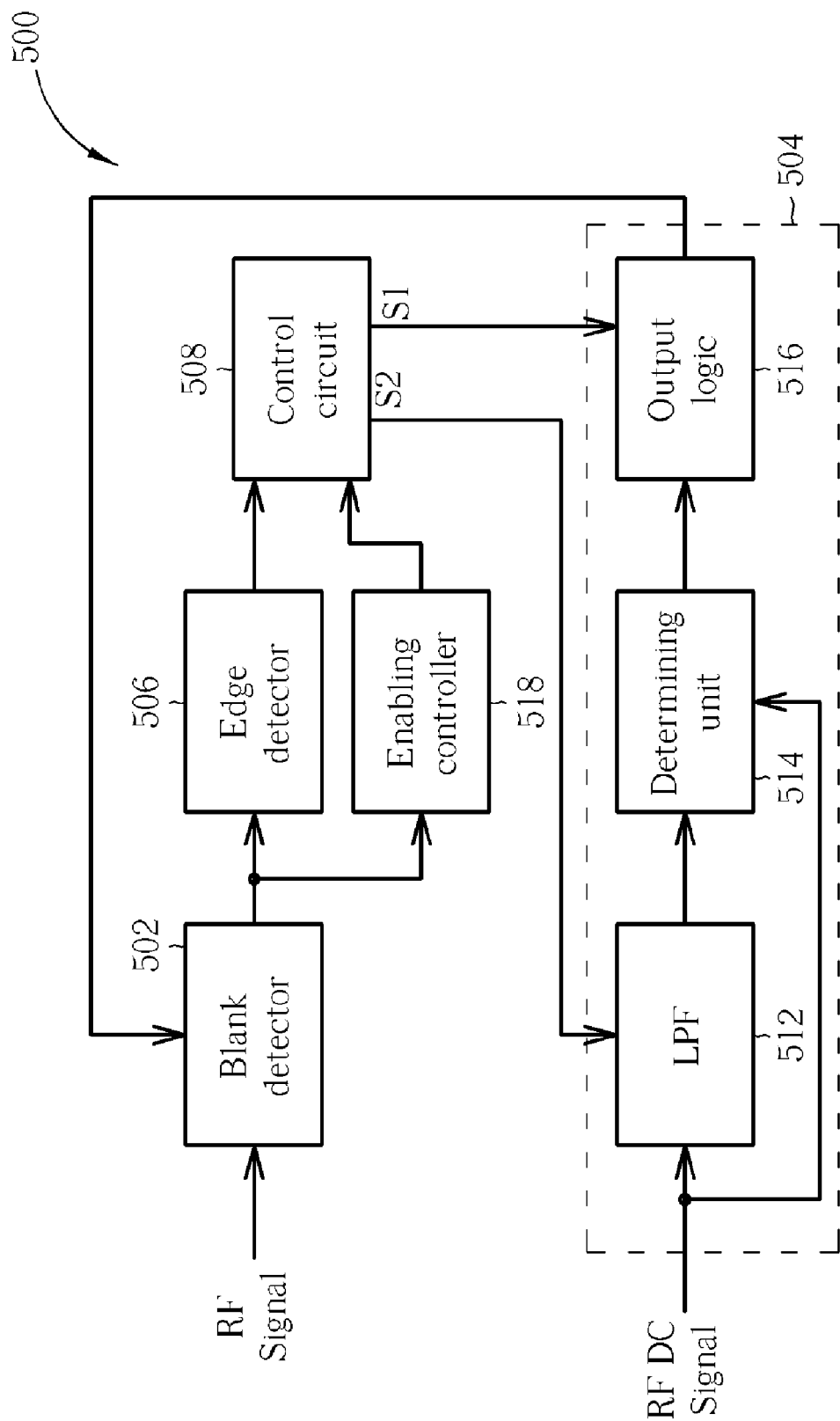
FIG. 5 is a diagram of a detecting apparatus for detecting statuses of an optical disc according to another exemplary embodiment of the invention.

FIG. 5 is a diagram of a detecting apparatus 500 provided with the adjusting mechanisms of the blank detector and the defect detector according to another exemplary embodiment of the invention. In this embodiment, the output of the defect detector 504 is further coupled to the blank detector 502 so that the blank detecting mechanism of the blank detector 502 can be adjusted when the defect detector 504 detects a defect. In order to prevent a reciprocal effect between the blank detector 502 and the defect detector 504 since the detecting results of the blank detector 502 are used to adjust the defect detecting mechanism of the defect detector 504, an enabling controller 518 is added between the blank detector 502 and the control circuit 508. It should be noted that the components of the same name in FIG. 5 and FIG. 2 have substantially the same functionality and operation, and further description is therefore omitted here for brevity. In this embodiment, the enabling controller 518 counts a length of the blank region detected by the blank detector 502, and enables the control circuit 508 when the length of the blank region reaches a predetermined value. For example, the predetermined value ranges from 1/3 to 1/48 of the length of an error correction code block in this embodiment. This is because the length of a blank region typically at least equals to the length of the error correction code block, if the length of the blank region detected by the blank detector 502 is larger than the predetermined value, such as 1/3 the length of the error correction code block, the detecting decision of the blank detector 502 is mostly reliable. Therefore, by utilizing this limitation, the detecting apparatus 500 can diminish the reciprocal effect between the blank detector 502 and the defect detector 504.

To conclude, the present invention discloses several detecting apparatus for detecting statuses of an optical disc and the methods thereof to avoid or reduce the influence caused by erroneous status decisions. The detecting result of the blank detector is utilized to adjust the detecting mechanism or the output of the defect detector when the edge of the blank region is detected, and the detecting result of the defect detector is utilized to adjust the detecting mechanism or the output of the blank detector as well. In this way, the present invention can improve the accuracy of the data decoded by the optical disc drive system and the stability of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detecting apparatus for detecting statuses of an optical disc, comprising:
   a blank detector, for detecting a blank region of the optical disc to generate a blank detection signal;
   an edge detector, coupled to the blank detector, for detecting a transition of the blank detection signal to generate an edge detection signal;
   a control circuit, in response to the edge detection signal for outputting a first control signal; and
   a defect detector in response to the first control signal for detecting defect region of the optical disc to generate a defect decision signal.

2. The detecting apparatus of claim 1, wherein the control circuit allows the first control signal to be transmitted to the defect detector during a period of time corresponding to a first predetermined time window.

3. The detecting apparatus of claim 1, wherein the defect detector comprises:
   a low pass filter for filtering a radio frequency (RF) DC signal to generate a filtered RF DC signal; and
   a determining unit, coupled to the low pass filter, for comparing the RF DC signal with the filtered RF DC signal to generate a comparison result, and determining if there is a defect according to the comparison result;
   wherein the control circuit outputs the first control signal to the low pass filter to adjust a bandwidth of the low pass filter.

4. The detecting apparatus of claim 1, wherein the control circuit outputs the first control signal to control an output of a defect decision signal of the defect detector.

5. The detecting apparatus of claim 4, wherein the defect detector further comprises:
   an output logic, coupled to the control circuit and the defect detector, for masking the output of the defect decision signal according to the first control signal.

6. The detecting apparatus of claim 1, further comprising:
   an enabling controller, coupled to the blank detector and the control circuit, for counting a length of the blank detection signal, and enabling the control circuit when the length of the blank region reaches a predetermined value.

7. The detecting apparatus of claim 6, wherein the predetermined value ranges from 1/3 to 1/48 the length of an error correction code block.

8. The detecting apparatus of claim 1, wherein the transition detected by the edge detector can be a rising edge or a falling edge.

9. The detecting apparatus of claim 1, wherein the blank detector in response to the defect decision signal detects the blank regions of the optical disc.

10. A detecting method for detecting statuses of an optical disc, comprising:
    detecting blank regions of the optical disc to generate a blank detection signal;
    detecting a transition of the blank detection signal to generate a edge detection signal;
    generating a first control signal according to the edge detection signal; and
    detecting defect regions of the optical disc in response to the first control signal to generate a defect decision signal.

11. The detecting method of claim 10, wherein the step of generating the first control signal comprises:
    allowing the first control signal to be transmitted during a period of time corresponding to a first predetermined time window.

12. The detecting method of claim 10, wherein the step of detecting the defect of the optical disc comprises:
    filtering an radio frequency (RF) DC signal to generate a filtered RF DC signal;
    comparing the RF DC signal with the filtered RF DC signal to generate a comparison result; and
    determining if there is a defect according to the comparison result;
    wherein the first control signal adjusts a bandwidth of the low pass filter.

13. The detecting method of claim 10, wherein the first control signal is generated to control the generating of the defect decision signal.

14. The detecting method of claim 13, wherein the first control signal is generated to mask the output of the defect decision signal.

15. The detecting method of claim 10, further comprising:
counting a length of the blank detection signal, and enabling the generating of the first control signal when the length of the blank detection signal reaches a predetermined value.

16. The detecting method of claim 15, wherein the predetermined value ranges from 1/3 to 1/48 the length of an error correction code block.

17. The detecting method of claim 10, wherein the step of detecting the transition of the blank detection signal comprises detecting a rising edge of the blank detection signal or detecting a falling edge of the blank detection signal.

18. The detecting method of claim 10, further comprising; detecting blank regions of the optical disc in response to the defect decision signal.

19. A detecting method for detecting statuses of an optical disc, comprising:
detecting defect regions of the optical disc to generate a defect decision signal;
detecting blank regions of the optical disc to generate a blank detection signal; and
outputting the blank detection signal according to the defect decision signal.

20. The detecting method of claim 19, wherein the step of detecting the defect regions of the optical disc comprises:
filtering an radio frequency (RF) DC signal to generate a filtered RF DC signal;
comparing the RF DC signal with the filtered RF DC signal to generate a comparison result; and
determining if there is a defect according to the comparison result to generate the defect decision signal.

21. A detecting apparatus for detecting statuses of an optical disc, comprising:
a defect detector, for detecting defect regions of the optical disc to generate a defect decision signal; and
a blank detector, coupled to the defect detector, for detecting blank regions of the optical disc to generate a blank detection signal, and for outputting the blank detection signal according to the defect decision signal.

22. The detecting apparatus of claim 21, wherein the defect detector comprises:
a low pass filter, for filtering an radio frequency (RF) DC signal to generate a filtered RF DC signal; and
a determining unit, coupled to the low pass filter, for comparing the RF DC signal with the filtered RF DC signal to generate a comparison result, and determining if there is a defect according to the comparison result to generate the defect decision signal.

* * * * *